Jan. 27, 1953 G. M. NEWLIN 2,626,553
VEHICLE MOUNTED IMPLEMENT
Filed Oct. 10, 1945 3 Sheets-Sheet 1
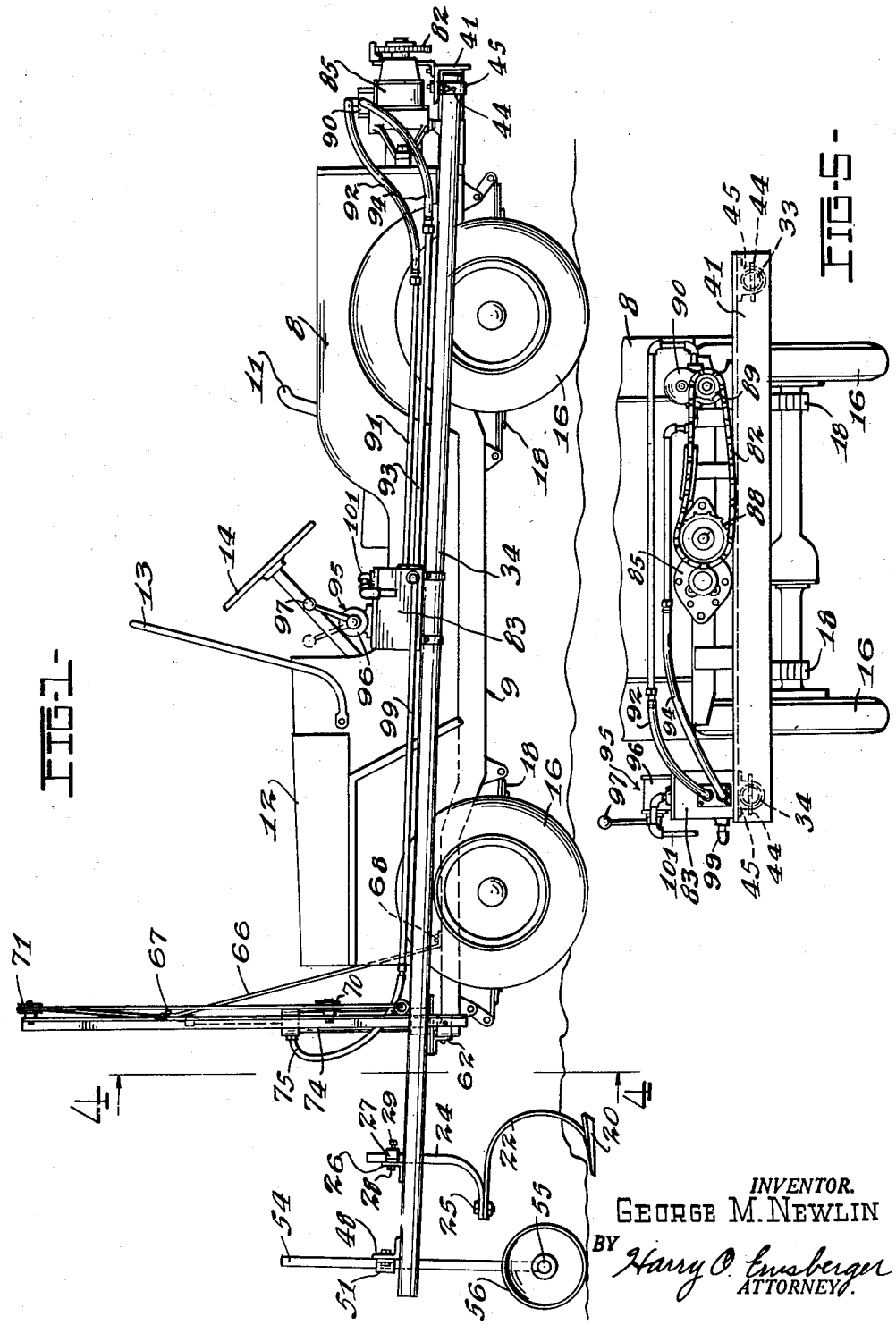
INVENTOR.
GEORGE M. NEWLIN
BY Harry O. Ernsberger
ATTORNEY.

Jan. 27, 1953 G. M. NEWLIN 2,626,553
VEHICLE MOUNTED IMPLEMENT
Filed Oct. 10, 1945 3 Sheets-Sheet 2
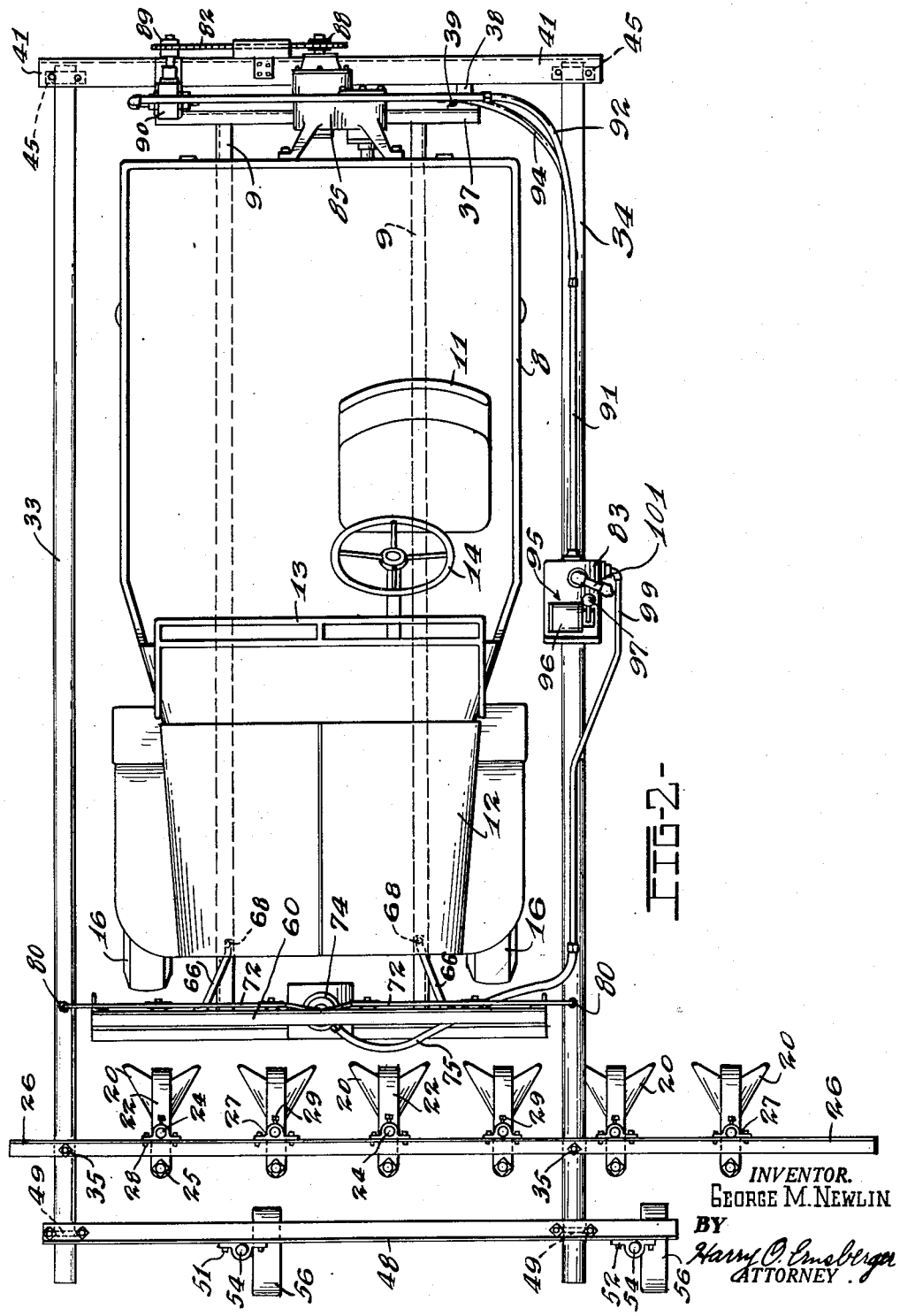
INVENTOR.
GEORGE M. NEWLIN
BY
Harry O. Ernsberger
ATTORNEY.

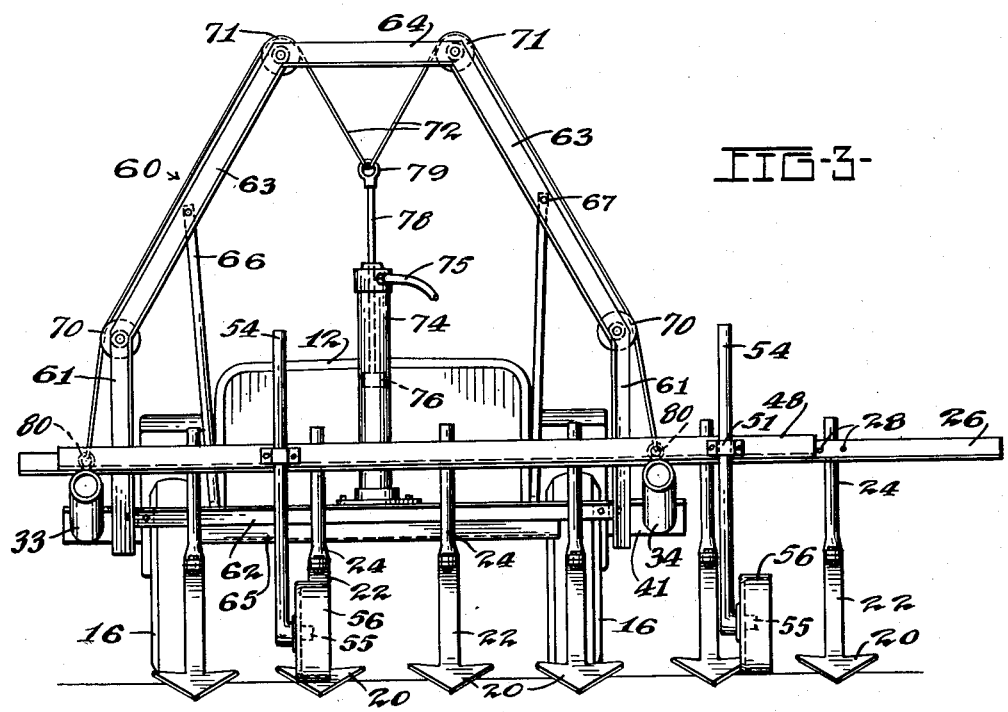

Patented Jan. 27, 1953

2,626,553

UNITED STATES PATENT OFFICE 2,626,553

VEHICLE MOUNTED IMPLEMENT

George M. Newlin, Farmington, Mich., assignor to Willys-Overland Motors, Inc., Toledo, Ohio, a corporation of Delaware Application October 10, 1945, Serial No. 621,542

1 Claim. (Cl. 97—50)

This invention relates to vehicle mounted implements or mechanism and is particularly directed to an arrangement of load moving or load carrying type especially adapted to be associated with a four wheel drive vehicle.

The invention comprehends the provision of a soil working or load moving implement which is adapted for mounting upon a four wheel drive vehicle and especially arranged whereby the soil working or loading moving apparatus is disposed forwardly of the vehicle.

An object of the invention more specifically is the provision of a soil working or load moving apparatus wherein the operative elements of the same are disposed in front of the vehicle and wherein the major working stresses of the apparatus are transmitted to the rear of the vehicle frame.

Another object of the invention resides in a simple yet effective means for lifting or elevating the soil working or load moving apparatus when not in operative use so that the apparatus will be entirely out of the way and whereby the arrangement may remain on the vehicle without interfering with its travel or its use for purposes other than soil working or load moving.

Another object of the invention resides in the provision of hydraulically actuated means for effecting a raising or lowering of soil working or load moving apparatus adapted to be supported upon a four wheel drive vehicle.

Still a further object of the invention is the provision of means for mounting soil cultivating apparatus forwardly of a four wheel drive vehicle and wherein the apparatus may be shifted laterally for purposes of adjusting the mechanism to various widths of crop rows.

Still a further object of the invention is the provision of a cultivator arrangement and mounting means whereby the same may be readily attached to or detached from an automotive vehicle without the use of special tools.

Further objects and advantages are within the scope of this invention such as relate to the arrangement, operation and function of the related elements of the structure, to various details of construction and to combinations of parts, elements per se, and to economics of manufacture and numerous other features as will be apparent from a consideration of the specification and drawings of a form of the invention, which may be preferred, in which:

Figure 1 is a side elevational view of a vehicle of four wheel drive character and soil working or load carrying apparatus associated therewith;

Figure 2 is a top plan view of the arrangement shown in Figure 1;

Figure 3 is a front elevational view of a four wheel drive vehicle showing the soil working or load carrying apparatus mounted thereon;

Figure 4 is a sectional view taken substantially on the line 4—4 of Figure 1;

Figure 5 is a rear elevational view of the vehicle particularly showing the power means for actuating the implement lifting apparatus and the mode of attachment of the apparatus to the rear of the vehicle.

While I have illustrated an implement or cultivator of a character particularly adapted for cultivating row crops associated with the four wheel drive vehicle, it is to be understood that I contemplate various forms of apparatus utilized for load moving or soil working purposes in lieu of the particular cultivating apparatus illustrated in the drawings.

Referring to the drawings in detail, the arrangement of my invention is particularly usable with a vehicle of four wheel drive character and, as illustrated, the vehicle is inclusive of a body 8 supported on a frame 9, the body arrangement being particularly adapted for carrying comparatively small loads. The body 8 is provided with a seat structure 11 for the vehicle operator. The vehicle includes a portion 12 which houses or encloses the engine or other prime mover (not shown), a windshield 13 and a steering wheel 14. The body and associated elements are supported by four wheels 16, all of which are adapted to be driven from the engine contained in the compartment 12 by suitable transmission mechanism (not shown), the wheels 16 being connected to the vehicle frame supporting the body through the medium of springs 18 or the like. Through the utilization of a vehicle supported upon four wheels on which all of the wheels are power driven, there is obtained a traction factor many times that attainable with a two wheel drive vehicle. The utilization of a four wheel drive vehicle provides sufficient traction to enable the satisfactory operation of the vehicle over soft earth and rough terrain, such a vehicle being satisfactorily employed for performing various types of load moving or soil working operations.

In the embodiment of the invention as illustrated in the drawings, the load moving or soil working implement is of the character especially adapted for cultivating crops which are arranged in consecutive rows and so spaced or disposed as to permit the vehicle's wheels to pass between or to straddle the crop rows. Any suitable type of cultivator shovel may be utilized. As illustrated, the cultivator shovels 20 are supported at the lower extremities of semi-annular bars 22 which are inherently resilient to a certain degree to permit a limited freedom of movement of the shovels 20 during soil working operations. At their upper extremities, the semi-annular bars 22 are secured, as by bolts 25, to the lower horizontal portions of L-shaped supports or members 24. Each of the supports or members 24 is independently vertically adjustable in order to vary the depth of the cultivating shovel in the soil as well as to align the several shovels constituting the cultivator construction. To this end a transversely extending beam or cultivator shovel support 26 is provided with a series of clamps or brackets 27 adapted to be secured to the beam 26 by means of clamping screws 28. Each bracket 27 has an opening to receive and accommodate the upwardly extending shank of member 24, the latter being held in the bracket by means of a locking screw 29. By manipulating the screws 27, the members 24 may be vertically adjusted with respect to the clamps, and the screws drawn up to hold the cultivator shovels in proper relation. Other types of cultivator shovels and supporting means therefor may be utilized without departing from the spirit of the invention.

Disposed at either side of the vehicle and extending substantially throughout the length thereof are the booms or bars 33 and 34, the said bars being fixedly secured to a transversely extending beam or member 26 by means of screws 35 or other suitable securing means. Secured to the rear portion of the vehicle frame 9 is a transversely extending bar 37, brackets 38 being fixedly secured to bar 37 by means of screws 39, the brackets supporting a second transversely extending bar or member 41. The rear extremities of the booms or struts 33 and 34 are pivotally connected by means of pivot pins 44 to brackets 45 the latter being fixedly secured to the bar 41. The booms 33 and 34 are pivotally associated with bar 41 in order that the forward portions of the booms may be elevated for the purpose of raising and lowering the load moving or earth working implements.

Secured to the booms 33 and 34 ahead of the cultivator arrangement is another transversely extending bar 48 secured to the booms by means of U-shaped clamps 49. The bar 48 supports a pair of brackets 51 and 52 configurated to receive the rods or members 54, the lower end of each rod being provided with a laterally extending shaft 55 upon which is journaled a wheel 56. The members 54 are vertically adjustable in the brackets 51 for the purposes of pre-positioning the wheels 56 with respect to the cultivator shovels 20 whereby the wheels 56 engage the earth or surface of the soil to regulate the depth of operation of the cultivator shovels.

The cultivator construction carried by the booms 33 and 34 pivot about the pins 44 to elevate the cultivator out of engagement with the soil or for lowering the cultivator shovels into the soil. The means for elevating or lowering the cultivator construction is inclusive of a yoke 60 having depending vertical bars 61 which are fixedly secured to a transverse bar 62 bolted or otherwise secured to the front bumper bar 65 which is mounted upon the forward portion of the frame 9 of the vehicle. Diagonally arranged bars 63 of the yoke construction are connected by means of a horizontal bar 64 at their upper extremities. The yoke construction is additionally secured to the vehicle frame by means of a pair of struts or braces 66 secured to the yoke by means of screws 67 and to the frame 9 of the vehicle by means of screws 68, the bracing struts lending stability to the yoke construction.

Journaled upon the yoke 60 at the extremities of the diagonally arranged struts 63 are pairs of pulleys 70 and 71 which support cables 72. Mounted forwardly of the vehicle upon the bar 62 is a vertically disposed cylinder 74 which is adapted to receive and discharge fluid through a tube 75 for raising and lowering the cultivator construction. Slidably disposed within cylinder 74 is a piston 76 carried at the extremity of a piston rod 78, the upper end of the rod 78 being provided with a fitting 79 which is secured to the extremities of each of the cables 72. The cables 72 take over the pulleys 70 and 71 and have their lower extremities connected to eye bolts 80 carried by the booms 33 and 34.

Mounted upon the boom 34 adjacent the vehicle operator's compartment is a tank or reservoir 83 which contains a supply of fluid as, for example, oil for elevating the implement carried by the vehicle. Disposed at the rear of the vehicle is a power take-off device 85 which is operated from the vehicle transmission by suitable means (not shown). The power take-off device 85 is provided with a sprocket 88 which is connected by means of a suitable chain or other power transmission medium 82 to a second sprocket 89, the latter adapted to drive a fluid circulating pump 90 which is supported upon the transversely extending bar 41.

Connected to the reservoir 83 is a tube 91 which includes a flexible tubular portion 92, the tubes 91 and 92 conveying oil or other fluid from the reservoir to the inlet side of the fluid pump 90. The fluid pump 90 is provided with an outlet through which oil or fluid may be delivered under pressure through the tube 93 and flexible tube 94 through the reservoir 83 to a valve or control means 95, which means includes a valve housing 96 and manipulating lever 97 for controlling the flow of oil to and from the cylinder 74. A tube 99 extends into the reservoir 83 and is in communication with the valve mechanism 95, the tube including flexible portion 75 in communication with the cylinder 74. The reservoir 83 is provided with an overflow pipe 101. The valve housing 96 includes a fluid pressure regulator or relief means (not shown) so that the fluid pressure in the system will not exceed a predetermined amount.

The operation of the invention is as follows: Assuming that the cultivator shovels 20 are resting upon the earth or other supporting surface, and it is desired to move the vehicle and implement to a point of use, the power take off device 85 operated through the vehicle transmission from the vehicle engine, is set into operation by movement of a manipulating lever (not shown) adjacent the operator's compartment. The operation or rotation of the power take-off means rotates the oil or fluid pump 90 through the medium of the chain 82, setting up a suction in the reservoir through the tubes 91 and 92, causing oil to flow from the reservoir through said tubes to the oil pump. The oil pump in operation sets up a fluid pressure in the tubes 93 and 94 which convey oil to the valve mechanism 95. The operator, if desiring to elevate the implement, moves the valve manipulating lever 97 in one direction establishing communication of fluid pressure in the tubes 93 and 94 with the tube 75 to convey fluid or oil under pressure into the cylinder 74 at the upper end thereof. The injection of fluid into the cylinder moves the piston 76 downwardly, actuating the cables 72, and elevating the booms 33 and 34 and the implement or cultivator mechanism carried by the booms. With the mechanism in elevated position, the vehicle may be driven rapidly to a field or zone where work is to be performed by the implement. The operator may lower the implement or cultivator at any time by releasing the hydraulic pressure set up in the cylinder 74 and tube 75 by simply moving the valve manipulating lever 97 in the other direction. The depth of the cultivator shovels 20 in the soil may be regulated by vertically adjusting the rods 54 and hence the relative position of the wheels 56.

The implement may be dis-assembled from the vehicle by disconnecting the rear transverse bar 41, removing the sprocket chain 82, and disconnecting the cables 72 from the eye bolts 80 and the tube 75 from the working cylinder 74.

It is apparent that, within the scope of the invention, modifications and different arrangements may be made other than is herein disclosed, and the present disclosure is illustrative merely, the invention comprehending all variations thereof.

What I claim is:

In combination with a vehicle having a power take-off mechanism, an operator's compartment, four main supporting power-driven wheels and a frame, a transverse bar rigidly secured to the rear of the vehicle frame, a pair of tubular booms disposed outside of and adjacent opposite sides of the vehicle, respectively, said booms being of greater length than said vehicle and extending longitudinally of the vehicle to project forwardly in front of the vehicle, means connecting said booms adjacent their rear ends to said transverse bar for pivotal movement about a horizontal axis, a transversely-extending beam secured to both said booms in front of said vehicle, a soil-working implement mounted on said beam, a fluid pump mounted on said vehicle at the rear thereof and connected to said power take-off mechanism to be driven thereby, a second transverse bar secured to both said booms in front of said transversely-extending beam, a plurality of ground-engaging wheels carried by said second transverse bar in front of said soil-working implement and mounted for vertical adjustment relative to said second transverse bar for determining the relative position of said implement with respect to said vehicle when said implement is in operative position, a vertically-disposed hydraulic cylinder supported upon the vehicle behind said beam, a piston reciprocable vertically in said cylinder, a pair of vertical bars individually supported by said vehicle and mounted adjacent said hydraulic cylinder, a pair of diagonal bars having one end connected to said vertical bars, a horizontal bar connecting the other end of said diagonal bars, pulleys mounted at the points of connection of said diagonal bars, cables connecting both booms with said piston and supported and guided by said pulleys, whereby movement of said piston in opposite directions in its cylinder raises and lowers, respectively, said booms and the soil-moving implement and ground-engaging wheels carried thereby, fluid-conveying means connecting said pump with said cylinder, and a control valve connected to said pump and said cylinder and associated with said fluid-conveying means for controlling the direction of flow of the operating fluid from said pump to said cylinder, said valve being mounted on one of said booms adjacent the operator's compartment of the vehicle in position to be operated manually from said compartment.

GEORGE M. NEWLIN.

REFERENCES CITED

The following references are of record in the file of this patent:

UNITED STATES PATENTS

| Number | Name | Date |
| --- | --- | --- |
| 1,442,796 | Detwiler | Jan. 23, 1923 |
| 1,788,698 | Wooldridge | Jan. 13, 1931 |
| 1,827,237 | Jones | Oct. 13, 1931 |
| 1,832,504 | Reynolds | Nov. 17, 1931 |
| 1,870,740 | Leiter | Aug. 9, 1932 |
| 1,890,228 | Miller | Dec. 6, 1932 |
| 1,894,516 | Karstedt | Jan. 17, 1933 |
| 1,936,749 | Cady et al. | Nov. 28, 1933 |
| 1,945,882 | Collins | Feb. 6, 1934 |
| 2,084,690 | Knapp | June 22, 1937 |
| 2,225,393 | Ray | Dec. 17, 1940 |
| 2,321,615 | Paulsen | June 15, 1943 |
| 2,322,115 | Cox et al. | June 15, 1943 |
| 2,391,224 | Carter | Dec. 18, 1945 |
| 2,404,760 | Washbond | July 23, 1946 |